(12) United States Patent
Flynn et al.

(10) Patent No.: US 10,570,866 B2
(45) Date of Patent: Feb. 25, 2020

(54) FUEL INJECTION THROTTLE BODY

(71) Applicant: Holley Performance Products, Inc., Bowling Green, KY (US)

(72) Inventors: Doug Flynn, Bowling Green, KY (US); James Dralle, Bowling Green, KY (US); Amy Gieske, Loogootee, IN (US); Charles Jenckes, Harrisburg, NC (US); Corey Spainhoward, Bowling Green, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 15/986,571

(22) Filed: May 22, 2018

(65) Prior Publication Data

US 2018/0266376 A1  Sep. 20, 2018

Related U.S. Application Data

(62) Division of application No. 14/156,813, filed on Jan. 16, 2014, now Pat. No. 10,012,197.

(60) Provisional application No. 61/892,706, filed on Oct. 18, 2013.

(51) Int. Cl.
| | |
|---|---|
| *F02M 61/18* | (2006.01) |
| *F02M 69/04* | (2006.01) |
| *F02M 35/10* | (2006.01) |
| *F02D 9/10* | (2006.01) |

(52) U.S. Cl.
CPC ....... *F02M 61/1826* (2013.01); *F02D 9/1035* (2013.01); *F02M 35/10216* (2013.01); *F02M 61/184* (2013.01); *F02M 69/043* (2013.01); *F02D 9/109* (2013.01)

(58) Field of Classification Search
CPC .... F02M 61/18; F02M 7/06; F02M 35/10216; F02M 61/1826; F02D 9/109
USPC .......................................................... 239/562
See application file for complete search history.

(56) References Cited

U.S. PATENT DOCUMENTS

| | | | | | |
|---|---|---|---|---|---|
| 1,153,436 | A | * | 9/1915 | McCray ................... | F02M 1/00 261/121.3 |
| 1,386,036 | A | * | 8/1921 | Weeks ...................... | F02M 9/00 261/44.5 |
| 1,394,536 | A | * | 10/1921 | Chase ....................... | F02M 5/12 261/44.5 |
| 1,465,449 | A | * | 8/1923 | Maegly ..................... | F02M 7/08 261/34.2 |

(Continued)

FOREIGN PATENT DOCUMENTS

| | | |
|---|---|---|
| AU | 339157 | 10/2011 |
| AU | 341133 | 2/2012 |

(Continued)

OTHER PUBLICATIONS

Transmittal Letter of Related Applications.

*Primary Examiner* — Chee-Chong Lee
(74) *Attorney, Agent, or Firm* — Middleton Reutlinger

(57) ABSTRACT

A throttle body fuel injection system including a throttle body with at least one air intake, a fuel injector coupled to the throttle body at a fuel port and an annular ring coupled to the cylindrical inner wall of the air intake. The annular ring includes a primary fuel discharge orifice adjacent to the fuel port and a plurality of secondary fuel discharge orifices arranged radially around the annular ring for spraying atomized fuel into the air intake.

6 Claims, 8 Drawing Sheets

(56) References Cited

U.S. PATENT DOCUMENTS

| | | | |
|---|---|---|---|
| 1,983,225 A * | 12/1934 | Gregg | F02D 23/005 |
| | | | 123/559.3 |
| 2,066,544 A * | 1/1937 | Shaw | F02M 9/103 |
| | | | 138/45 |
| 2,428,377 A | 10/1947 | Morris | |
| 3,564,580 A | 2/1971 | Cinque | |
| 3,659,572 A * | 5/1972 | Pelizzoni | F02M 7/133 |
| | | | 123/337 |
| 3,763,936 A | 10/1973 | Menage | |
| 3,799,514 A | 3/1974 | Braden | |
| 3,800,531 A | 4/1974 | Sharpe | |
| 3,800,769 A | 4/1974 | Graffman | |
| 4,224,908 A | 9/1980 | Bier et al. | |
| 4,230,645 A | 10/1980 | Dodson | |
| 4,246,875 A | 1/1981 | Bier | |
| 4,250,856 A * | 2/1981 | Abbey | F02M 9/14 |
| | | | 123/439 |
| 4,294,282 A | 10/1981 | McCabe et al. | |
| 4,306,441 A | 12/1981 | Dodson | |
| 4,318,214 A | 3/1982 | Dodson | |
| 4,325,339 A | 4/1982 | Bier et al. | |
| 4,357,283 A | 11/1982 | Manning | |
| 4,373,500 A * | 2/1983 | Haynes | F02M 23/001 |
| | | | 123/587 |
| 4,406,266 A | 9/1983 | Kiesling | |
| 4,434,762 A | 3/1984 | Mccabe | |
| 4,434,763 A | 3/1984 | Mccabe et al. | |
| 4,465,640 A | 8/1984 | Dougherty | |
| 4,515,134 A | 5/1985 | Warren, II | |
| 4,539,960 A | 9/1985 | Cowles | |
| 4,556,032 A | 12/1985 | Miller | |
| 4,558,673 A | 12/1985 | Mackie | |
| 4,681,178 A | 7/1987 | Brown | |
| 4,736,969 A | 4/1988 | Fouts | |
| 4,798,190 A | 1/1989 | Vaznaian et al. | |
| 4,798,329 A | 1/1989 | Mesenich | |
| 4,802,902 A | 2/1989 | Bauerle | |
| 4,817,996 A | 4/1989 | Fouts | |
| 4,826,411 A | 5/1989 | Gaeth | |
| 4,827,888 A | 5/1989 | Vaznaian et al. | |
| 4,929,260 A | 5/1990 | Bauerle | |
| 4,949,983 A | 8/1990 | Miller | |
| 4,966,735 A | 10/1990 | LoRusso | |
| 5,009,390 A | 4/1991 | Mcauliffe, Jr. et al. | |
| 5,012,780 A | 5/1991 | Bugamelli | |
| 5,113,831 A | 5/1992 | Grant | |
| 5,148,863 A | 9/1992 | Fouts et al. | |
| 5,186,033 A | 2/1993 | Nieczyporowicz | |
| 5,208,540 A | 5/1993 | Hoeflich | |
| 5,211,205 A | 5/1993 | Grant et al. | |
| 5,235,948 A | 8/1993 | Grant et al. | |
| 5,261,382 A | 11/1993 | Nikolai | |
| 5,325,915 A | 7/1994 | Fouts et al. | |
| 5,460,247 A | 10/1995 | Fouts | |
| 5,527,149 A | 6/1996 | Moss et al. | |
| 5,551,404 A | 9/1996 | Bauerle et al. | |
| 5,598,826 A | 2/1997 | Hunt et al. | |
| 5,807,512 A | 9/1998 | Grant | |
| 5,809,972 A | 9/1998 | Grant | |
| 5,863,470 A | 1/1999 | Grant | |
| 5,875,872 A | 3/1999 | Fouts | |
| 5,890,476 A | 4/1999 | Grant | |
| 5,908,090 A | 6/1999 | Fouts | |
| 5,959,263 A | 9/1999 | Foltz, Jr. | |
| 6,120,007 A | 9/2000 | Grant | |
| 6,125,467 A | 9/2000 | Dixon | |
| 6,165,775 A | 12/2000 | Shigemitsu | |
| 6,196,364 B1 | 3/2001 | Fouts | |
| 6,205,395 B1 | 3/2001 | Young et al. | |
| D447,147 S | 8/2001 | Grant | |
| 6,272,428 B1 | 8/2001 | Heath | |
| 6,339,743 B1 | 1/2002 | Young et al. | |
| 6,378,512 B1 | 4/2002 | Staggemeier | |
| 6,481,698 B1 | 11/2002 | Calvin et al. | |
| 6,482,698 B2 | 11/2002 | Peschiaroli et al. | |
| 6,520,488 B1 | 2/2003 | Braswell | |
| 6,535,811 B1 | 3/2003 | Rowland et al. | |
| 6,837,228 B2 | 1/2005 | Baash et al. | |
| 6,874,768 B2 | 4/2005 | Grant | |
| D508,496 S | 8/2005 | Grant | |
| D543,555 S | 5/2007 | Braswell | |
| 7,255,331 B2 | 8/2007 | Grant | |
| D555,668 S | 11/2007 | Benoit | |
| 7,343,896 B2 | 3/2008 | Grant et al. | |
| D578,550 S | 10/2008 | Benoit | |
| 7,533,661 B2 | 5/2009 | Baasch | |
| 7,591,245 B2 | 9/2009 | Baash et al. | |
| 7,634,983 B2 | 12/2009 | Grant | |
| 7,658,177 B2 | 2/2010 | Baasch et al. | |
| D645,058 S | 9/2011 | Benoit | |
| D648,746 S | 11/2011 | Tipton et al. | |
| D655,311 S | 3/2012 | Gieske et al. | |
| D659,714 S | 5/2012 | Gieske et al. | |
| D721,389 S | 1/2015 | Gieske et al. | |
| 9,115,671 B2 | 8/2015 | Benoit | |
| 9,303,578 B2 | 4/2016 | Wittkopf et al. | |
| D760,804 S | 7/2016 | Shehan et al. | |
| 9,845,740 B2 | 12/2017 | Wittkopf et al. | |
| D808,435 S | 1/2018 | Shehan et al. | |
| D810,142 S | 2/2018 | Shehan et al. | |
| 10,012,197 B2 | 7/2018 | Flynn et al. | |
| 10,094,353 B2 | 10/2018 | Bennett et al. | |
| 2001/0049166 A1 | 12/2001 | Peschiaroli et al. | |
| 2002/0043238 A1 | 4/2002 | McMaster | |
| 2002/0100530 A1 | 8/2002 | Mcelrath et al. | |
| 2003/0062428 A1 | 4/2003 | Baash et al. | |
| 2004/0084032 A1 | 5/2004 | Baash | |
| 2004/0155367 A1 | 8/2004 | Grant | |
| 2005/0082694 A1 | 4/2005 | Grant | |
| 2005/0110170 A1 | 5/2005 | Grant | |
| 2006/0244158 A1 | 11/2006 | Grant et al. | |
| 2008/0110435 A1 | 5/2008 | Baasch et al. | |
| 2008/0110436 A1 | 5/2008 | Baasch et al. | |
| 2008/0302326 A1 | 12/2008 | Grant | |
| 2009/0101104 A1 | 4/2009 | Baasch et al. | |
| 2012/0198852 A1 | 8/2012 | Hernandez | |
| 2015/0108256 A1 | 4/2015 | Flynn et al. | |
| 2018/0119656 A1 | 5/2018 | Shehan et al. | |

FOREIGN PATENT DOCUMENTS

| | | |
|---|---|---|
| AU | 348732 | 5/2013 |
| AU | 348733 | 5/2013 |
| AU | 348734 | 5/2013 |
| AU | 356762 | 8/2014 |
| AU | 201710470 | 2/2017 |
| AU | 201710471 | 2/2017 |
| AU | 201813353 | 8/2018 |
| AU | 201813355 | 8/2018 |
| AU | 201815034 | 9/2018 |
| AU | 201815036 | 9/2018 |
| AU | 201816623 | 12/2018 |
| AU | 201816624 | 12/2018 |
| CA | 2391589 | 5/2001 |
| CN | 101568711 | 4/2013 |
| EP | 3729599 | 1/2017 |
| GB | 2409239 | 10/2012 |
| WO | 0040445 | 7/2000 |
| WO | 0133185 | 5/2001 |
| WO | 0136804 | 5/2001 |
| WO | 03027476 | 4/2003 |
| WO | 2007014165 | 11/2007 |
| WO | 2008061065 | 5/2008 |

* cited by examiner

Fig_2

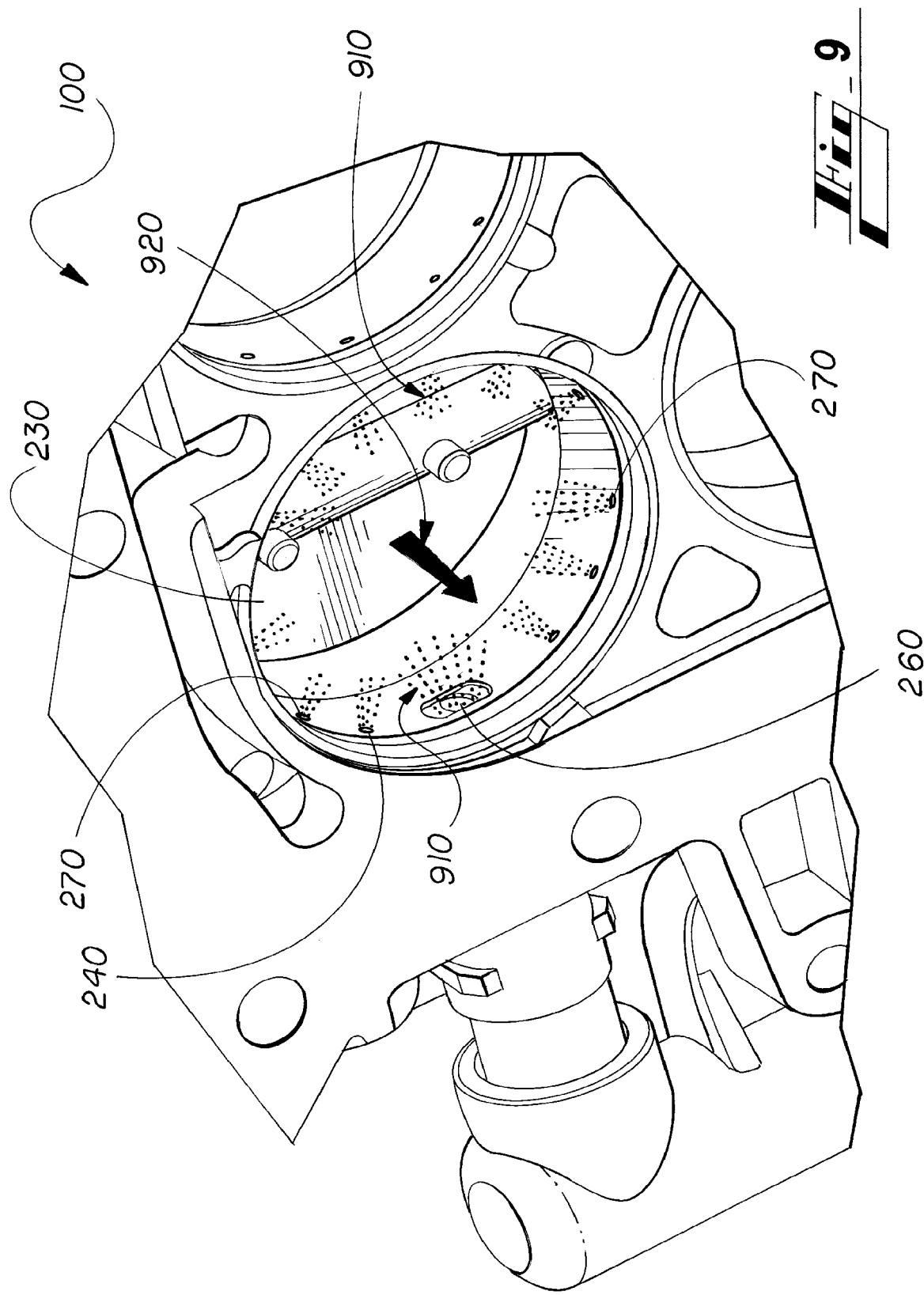

FUEL INJECTION THROTTLE BODY

CLAIM TO PRIORITY

This divisional patent application claims priority to and benefit of, under 35 U.S.C. § 121, U.S. patent application Ser. No. 14/156,813, filed Jan. 16, 2014 and titled "Fuel Injection Throttle Body", which claims priority to U.S. Provisional Application Ser. No. 61/892,706, filed on Oct. 18, 2013, and titled "Fuel Injection Throttle Body", all of which is incorporated by reference herein.

BACKGROUND OF THE INVENTION

Throttle Body Fuel Injection ("TBI") is a type of Electronic Fuel Injection ("EFI") for internal combustion engines that became main stream in factory vehicles during the 1980's. TBI Fuel Injection consists of an air metering valve that contains fuel injectors. The air metering valve allows more airflow as driver depresses gas pedal. The fuel injectors add fuel as a function of airflow. The TBI is controlled by an Electronic Control Unit ("ECU").

Factory car producers moved away from this type of fuel injection as government emissions standards increased in the mid-to-late 1980's. However, the aftermarket automotive parts industry started selling aftermarket TBI fuel injection systems in the late 1980's. These systems were designed to replace the carburetor on older carbureted vehicles from the 1960's to 1980's.

One of the limitations of many aftermarket fuel injection systems is that the end consumer has to have a significant level of knowledge on tuning the ECU that controlled these systems. Recently, technology has advanced and several companies now offer systems that are "self-tuning", where the end consumer only has to perform basic installation, and the ECU monitors various sensors and automatically tunes itself. This has caused resurgence in people purchasing TBI systems to retrofit older carbureted vehicles. The main benefit of TBI fuel injection is the fact that it can be retrofit fairly easy on older carbureted vehicles, on many different applications, as compared to other types of fuel injection methods such as Multiport EFI, which requires replacement of a multitude of original engine components.

Factory TBI system designs utilized fuel injectors that sprayed fuel at higher pressure that were placed vertically above the throttle plates of the throttle body. Mostly due to aesthetics, and available fuel injector designs, most aftermarket TBI systems place fuel injectors horizontally (or close to a horizontal position) into the sides of the throttle body. Unlike the factory TBI designs, this horizontal placement requires a throttle body design that redirects the normal fuel injector spray pattern. If fuel is not directed into the throttle body in a way that atomizes the fuel so it can thoroughly mix with the airstream through the throttle body, the engine may not run smoothly, may not make adequate power, and may have poor fuel economy and emissions.

SUMMARY OF THE INVENTION

In order to overcome the limitations of current aftermarket TBI designs, embodiments of this invention are such, that a conventional high pressure electronically controlled fuel injector sprays into a chamber that is constrained by an annular fuel distribution ring. The annular fuel distribution ring may contain at least one radial channel and orifices couple to the channel. In some embodiments the orifices may be of different shapes and sizes. The orifices allow the fuel to exit into the air stream from several positions around the circumference of an air intake in the throttle body, allowing the fuel to mix with the air and enter the engine in an optimally atomized state.

BRIEF DESCRIPTION OF THE DRAWINGS

FIG. 9 is a schematic isometric view showing the fuel injection and air flow according to an embodiment of the invention.

DETAILED DESCRIPTION OF THE PREFERRED EMBODIMENTS

Figure 1:
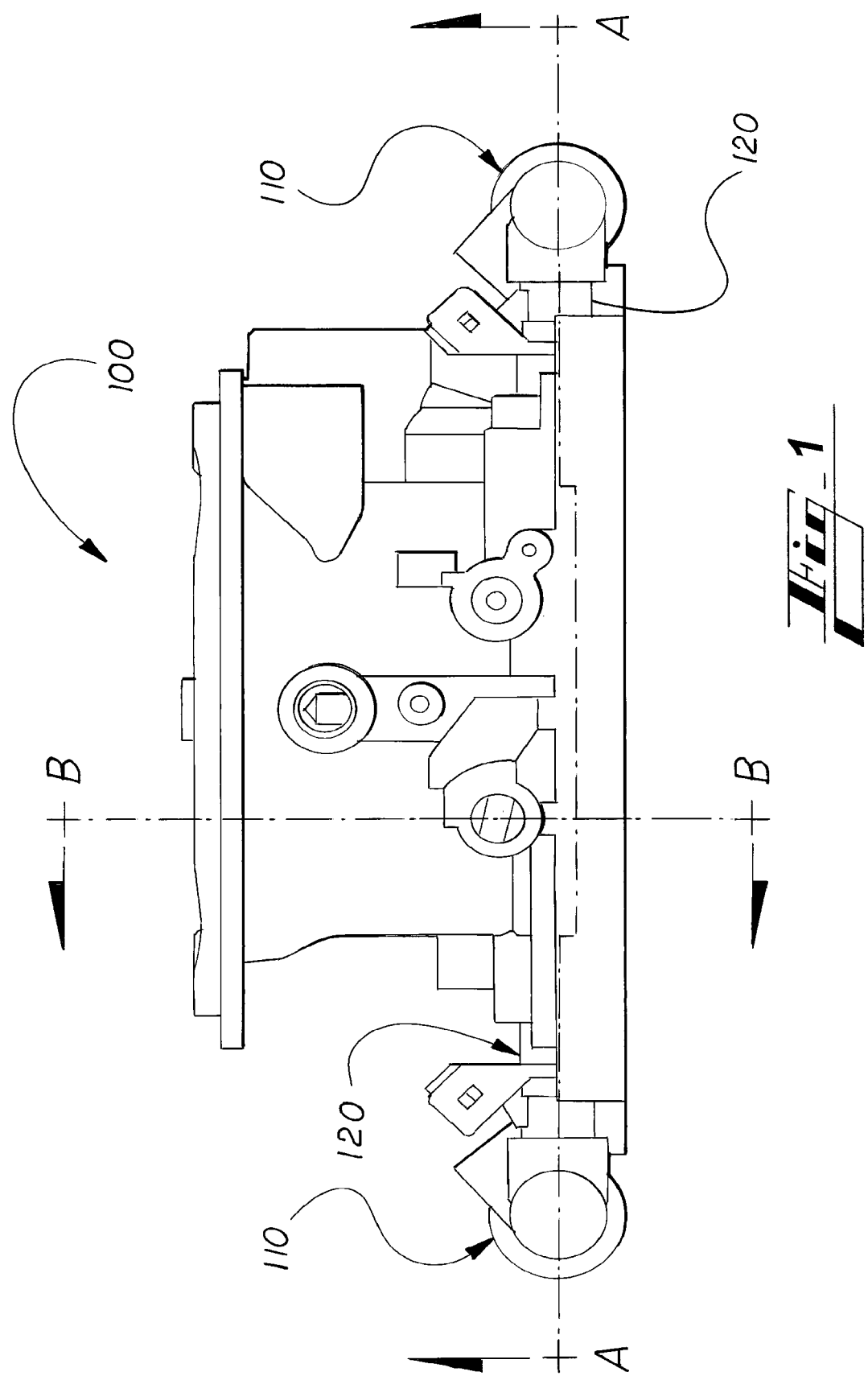
FIG. 1 is a front plan view of a throttle body with annular fuel injection according to an embodiment of the invention.
Figure 2:
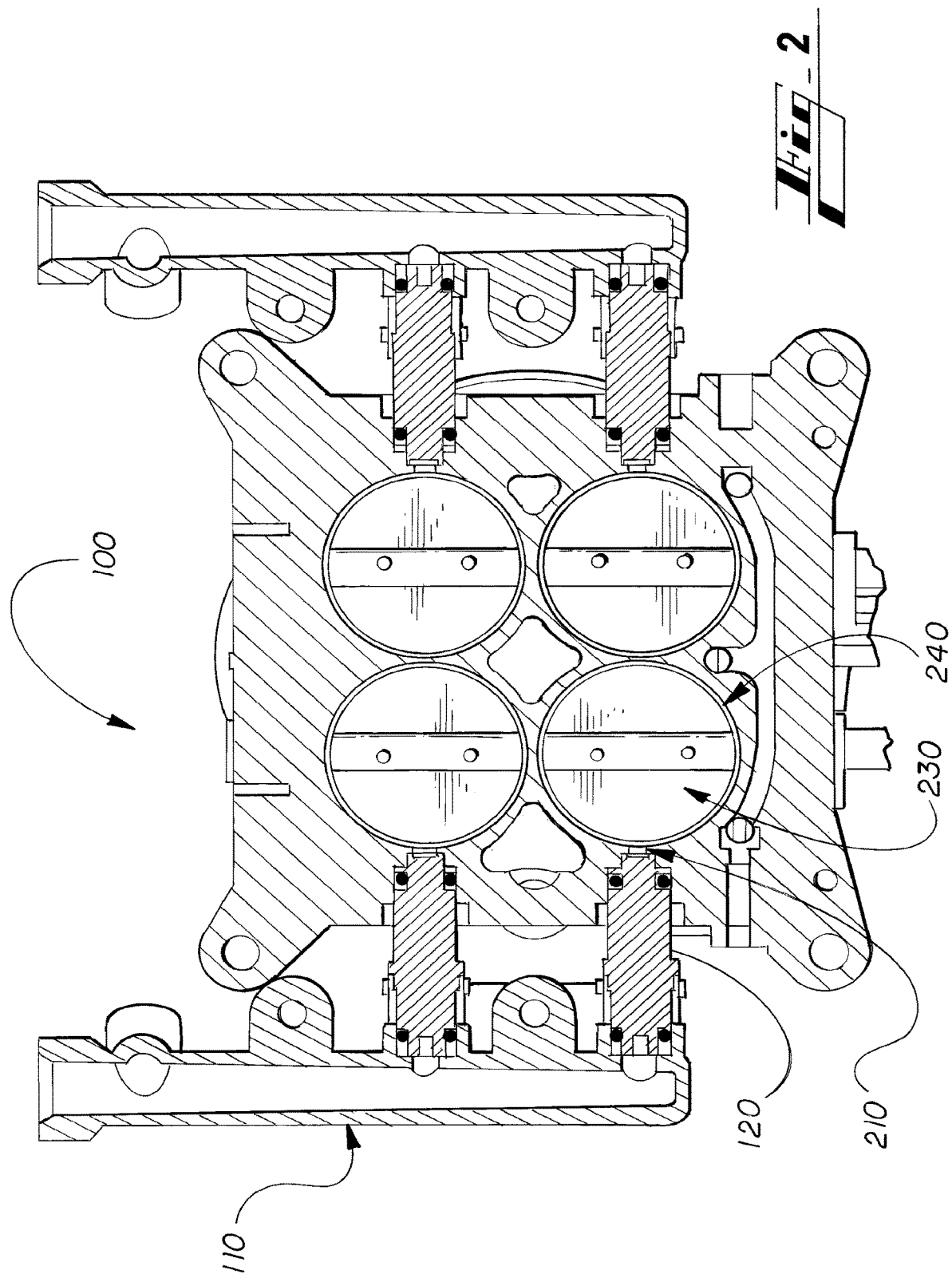
FIG. 2 is cross-section view A-A of the throttle body of FIG. 1.
Figure 3:
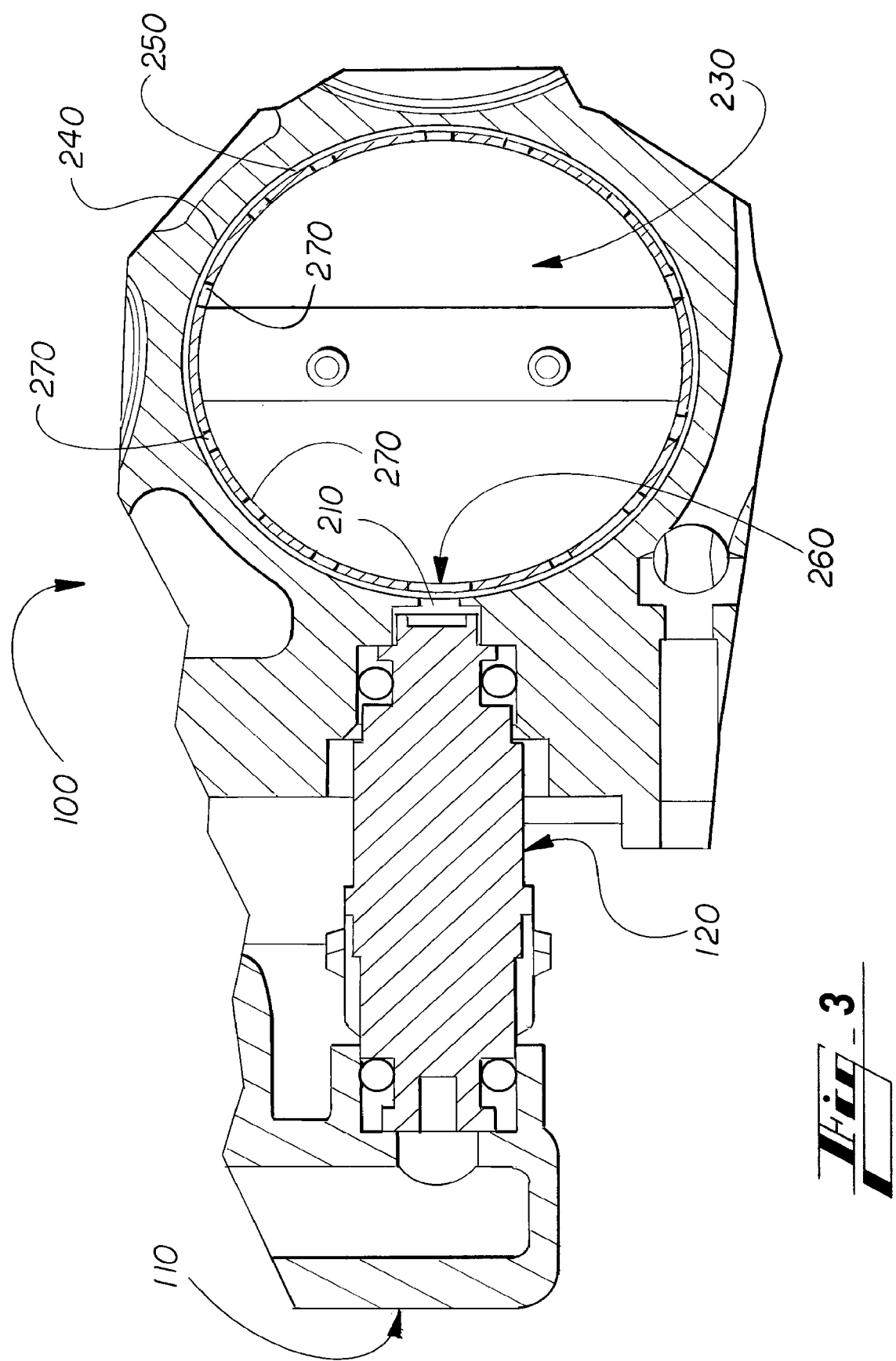
FIG. 3 is detail view C of the throttle body of FIG. 2.
Figure 4:
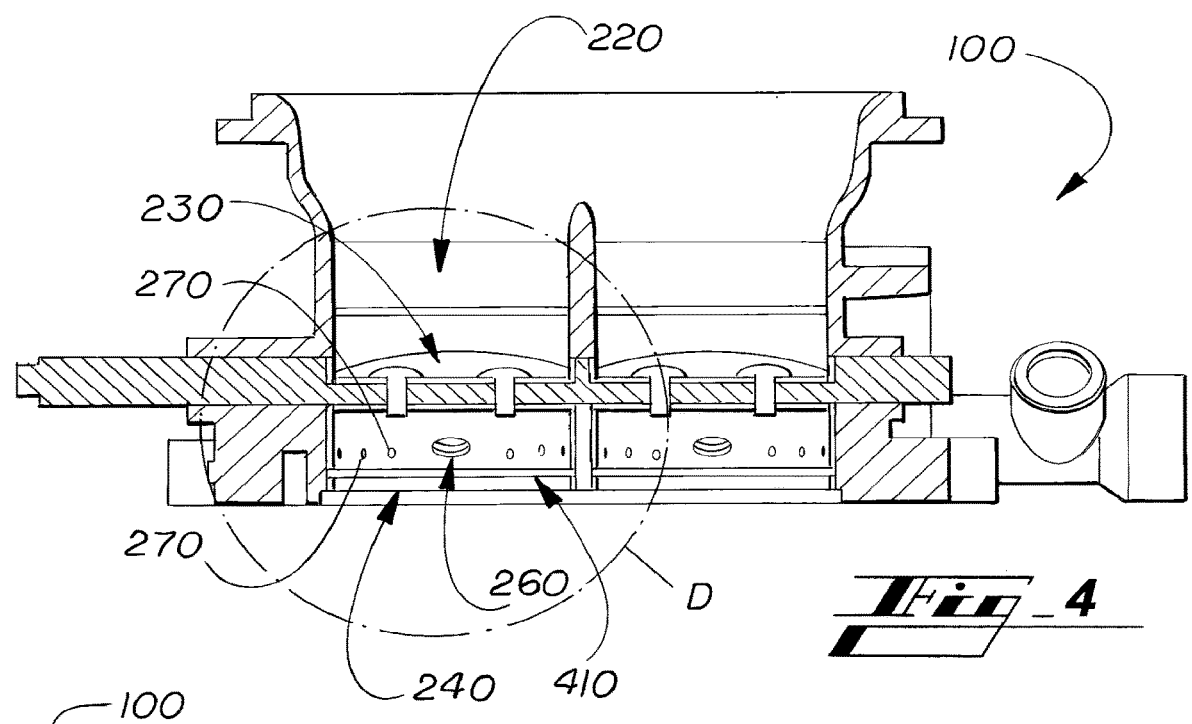
FIG. 4 is cross-section view B-B of the throttle body of FIG. 1.
Figure 5:
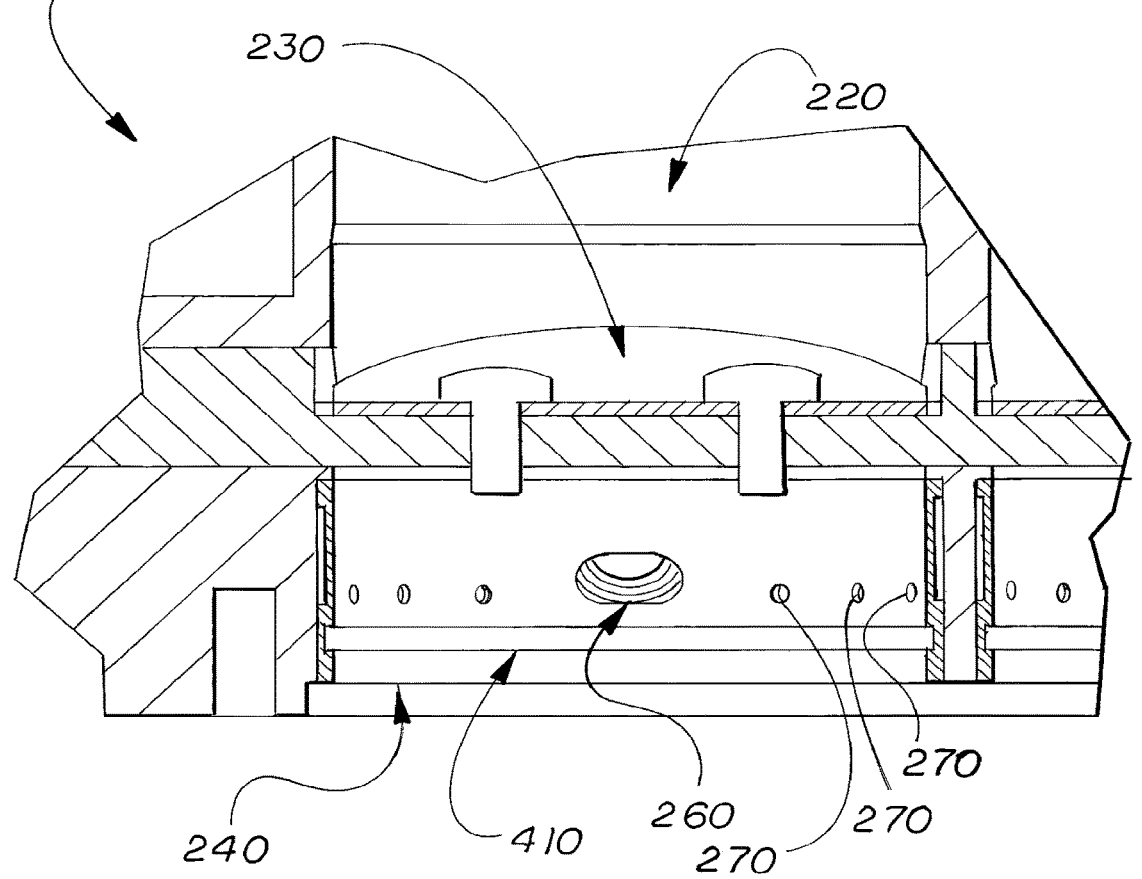
FIG. 5 is detail view D of the throttle body of FIG. 4.
Figure 6:
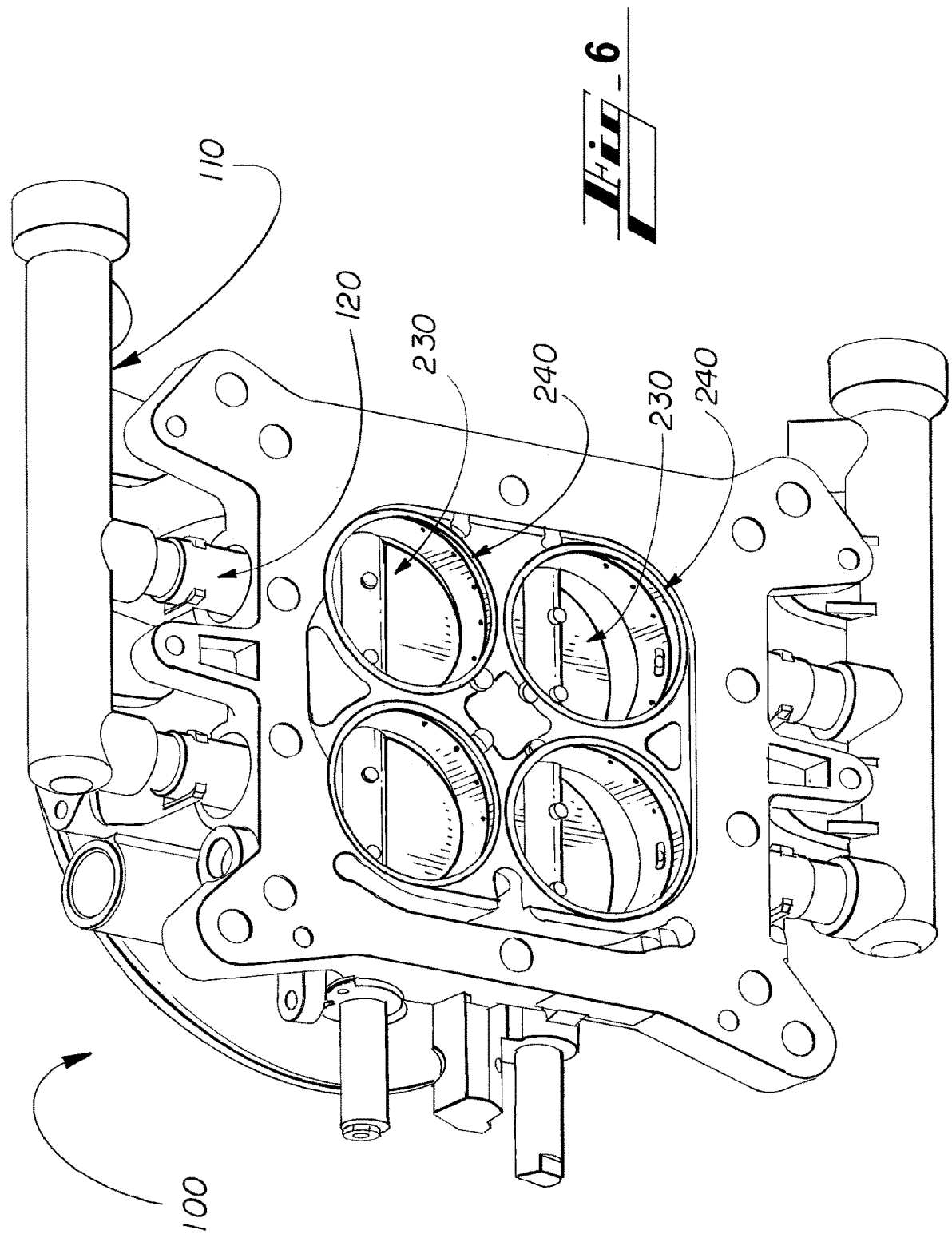
FIG. 6 is an isometric bottom view of a throttle body with annular fuel injection according to an embodiment of the invention.
Figure 7:
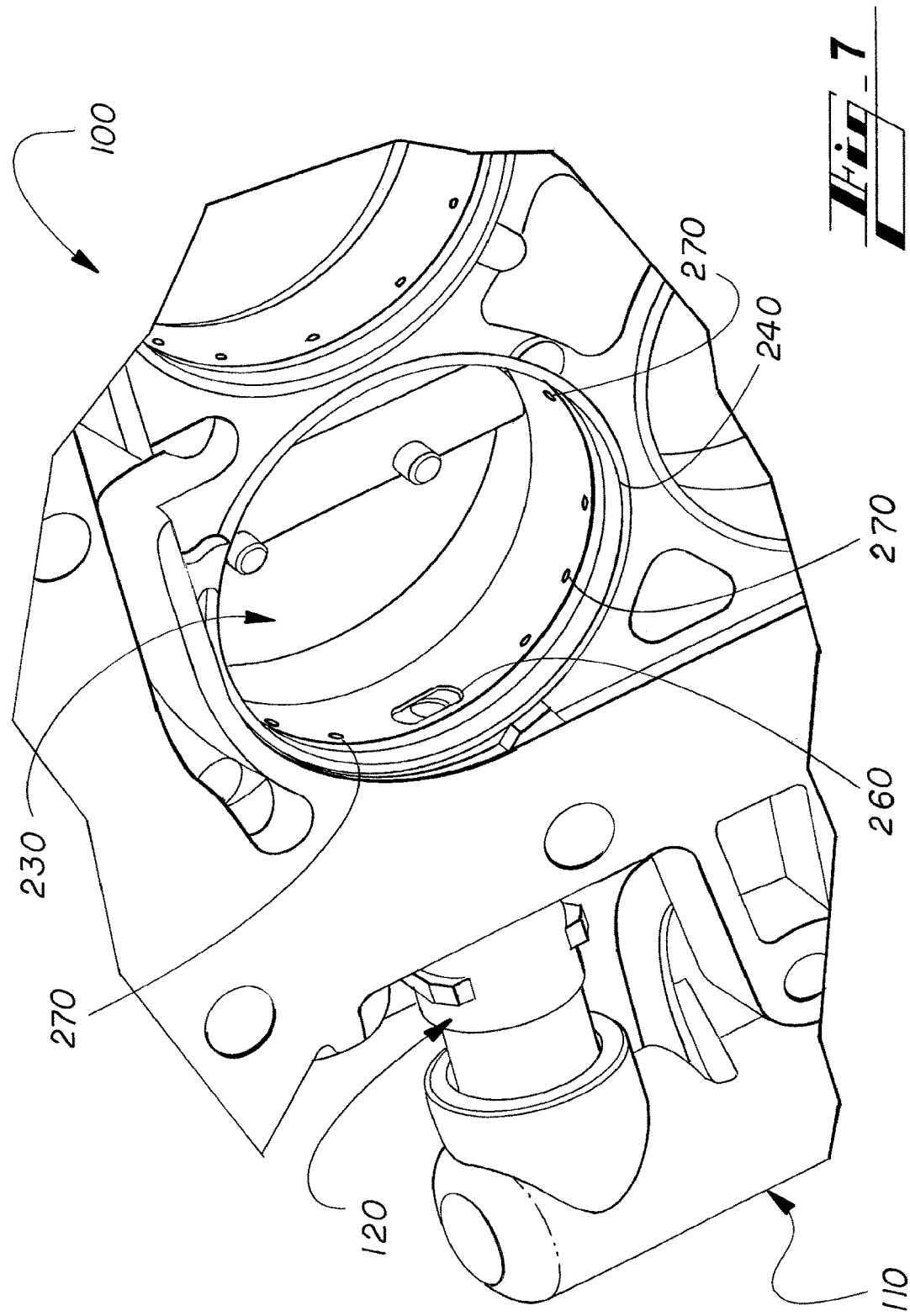
FIG. 7 is detail view E of the throttle body of FIG. 6.

Shown in FIG. 1 is an embodiment of a throttle body 100 having fuel rails 110 aligned horizontally near the bottom surface of the throttle body 100. The fuel rails 110 provide pressurized fuel to the fuel injectors 120, which couple to the throttle body 100 at fuel ports 210 (not shown). In some embodiments the fuel injectors 120 may be aligned horizontally in respect to the throttle body 100. In other embodiments the fuel injectors 120 may be aligned at an angle above or below horizontal in respect to the throttle body 100.

As shown in FIGS. 2-7, each fuel rail 110 may be coupled to one or more fuel injectors 120. Each fuel injector 120 provides fuel through a fuel port 210 into an annular ring 240 positioned in an air intake 220 of the throttle body 100 below the throttle plate 230. The annular ring 240 includes an annular fuel channel 250 for distributing fuel around the annular ring 240 to a plurality of fuel discharge orifices 260 and 270. The plurality of fuel discharge orifices 260 and 270 are configured to atomize and spray the fuel into the air intake 220 from multiple directions.

In some embodiments there may be a larger primary fuel discharge orifice 260 aligned in front of the fuel port 210 along with a plurality of smaller secondary fuel discharge orifices 270 aligned radially around the annular ring 240. In various embodiments the secondary fuel discharge orifices 270 may vary in size and shape as desired. In some embodiments the fuel discharge orifices 260 and 270 may be of circular, ovular, elliptical, and/or polygonal shapes.

In one embodiment the primary fuel discharge orifice 260 may be a 0.25 inch diameter circular orifice. In other embodiments the primary fuel discharge orifice 260 may be a 0.28 to 0.40 inch wide by 0.155 ovular-slot orifice.

In one embodiment the secondary fuel discharge orifices 270 may be 0.047 to 0.100 inch diameter circular orifices. The secondary fuel discharge orifices 270 may be spaced radially around the annular ring 240 at angular separations of 20 to 38 degrees from adjacent orifices.

Figure 8:
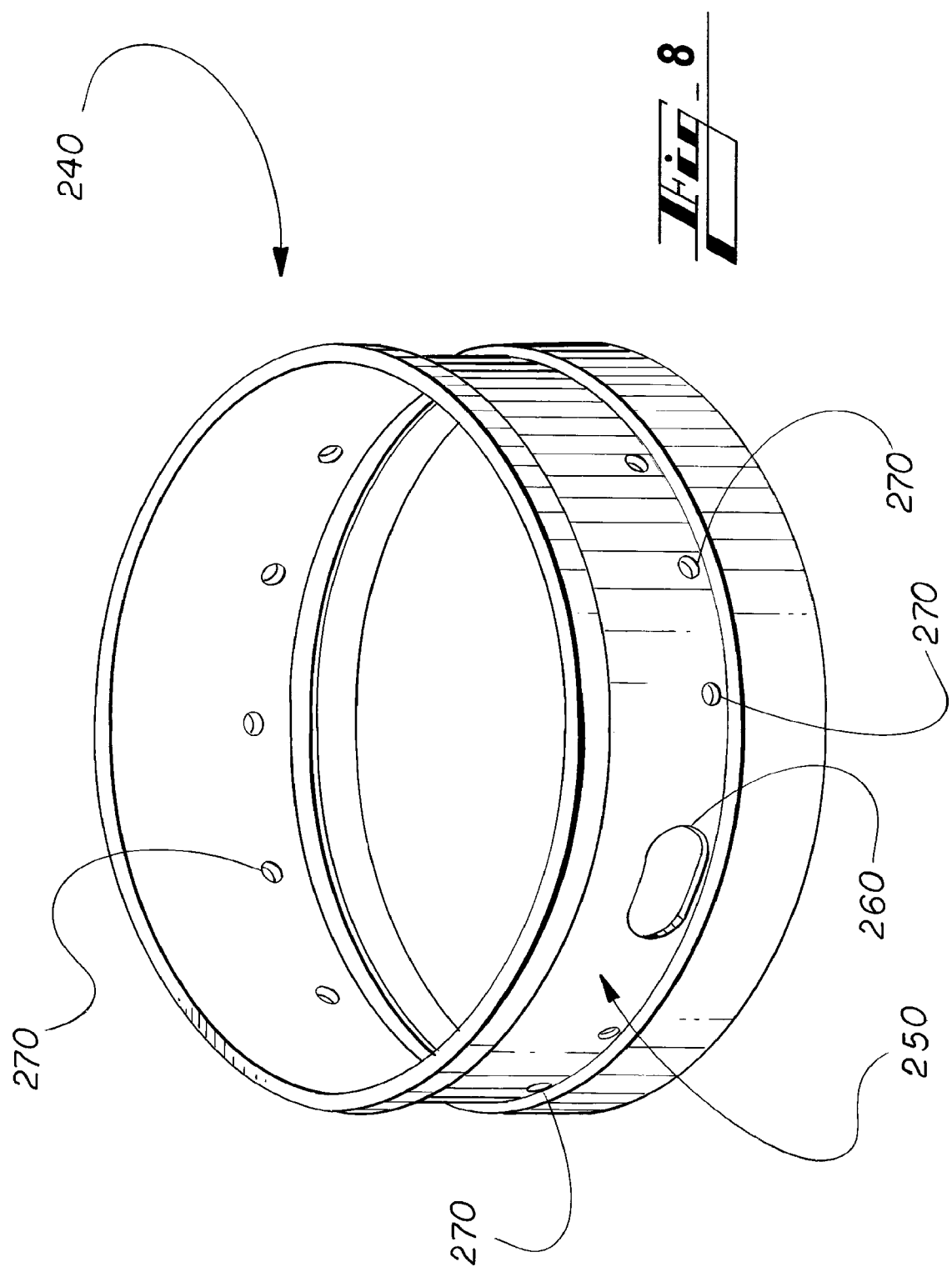
FIG. 8 is an isometric top view of the annular ring element according to an embodiment of the invention.

In a preferred embodiment the annular ring 240 includes a 0.28 inch wide by 0.155 inch ovular-slot high primary fuel discharge orifice 260 and thirteen 0.047 inch diameter circular secondary fuel discharge orifices 270 radially spaced at 20-38 degrees apart from adjacent orifices, and centered on the primary fuel discharge orifice 260, as shown in FIG. 8.

It will be appreciated by those skilled in the art that the primary fuel discharge orifice 260 and the secondary fuel discharge orifices 270 may each be a variety of shapes having close to the same orifice opening areas as those described in the various embodiments of the invention.

During operation, air enters the throttle body 100 through an air intake 220. The flow rate of the air through the air intake 220 is regulated by the throttle plate 230, which may be controlled electromechanically by an ECU (not shown), or mechanically. Pressurized fuel flows through a fuel rail 110 and into a fuel injector 120 controlled by the ECU, which regulates the amount of fuel flowing through the fuel port 210 into the air intake 220. As shown in FIG. 9, the fuel flow exits the fuel port 210 a portion of the fuel enters the air flow 920 in the air intake 220 through the primary fuel discharge orifice 260 as atomized fuel 910. The remainder of the fuel enters the annular fuel channel 250 and exits the annular fuel channel 250 through the secondary fuel discharge orifices 270 and enters the air flow 920 in the air intake 220 as atomized fuel 910.

In preferred embodiments of the invention, 40% to 60% of the fuel enters the air intake 220 though the primary fuel discharge orifice 260.

In various embodiments the throttle body 100 may have one or more air intakes 220 with each air intake 220 including a throttle plate 230, a fuel injector 120, and an annular ring 240.

In some embodiments of the throttle body 100, the annular fuel channel 250 may be a part of the throttle body 100 rather than of part of the annular ring 240. In other embodiments the throttle body 100 and annular ring 240 may include complimentary portions of the annular fuel channel 250.

In some embodiments the inner wall air intake 220 may have a larger diameter equal to the outer diameter of the annular ring 240 near the bottom to accommodate the annular ring 240 so the inner wall of the air intake 220 and the annular ring 240 form a smooth continuous surface to aid air flow.

In some embodiments the annular ring 240 may include an annular groove 410 or other means to aid the installing and/or removing the annular ring 240 from the throttle body 100.

In various embodiments the annular ring 240 may be coupled to the throttle body 100 by one or more of a press fit, threads, a friction fit, mechanical fasteners, adhesives, and welds.

In various embodiments the annular ring 240 may be made of aluminum, steel, cast iron, other metals, plastics, composites, or other materials and/or combinations of materials suitable for throttle body applications.

In the preceding specification, various preferred exemplary embodiments have been described with reference to the accompanying drawings. It will, however, be evident that various modifications and changes may be made thereto, and additional exemplary embodiments may be implemented, without departing from the broader scope of the invention as set forth in the claims that follow. The specification and drawings are accordingly to be regarded in an illustrative rather than restrictive sense.

The invention claimed is:

1. A method for fuel injection of an internal combustion engine with reciprocating piston, comprising:
   providing a flow of air entering an air intake of a throttle body with annular fuel injection;
   providing fuel from an electromechanically controlled fuel injector through an annular channel to only one primary fuel discharge orifice and to a plurality of secondary fuel discharge orifices, wherein the primary fuel discharge orifice is larger than said plurality of secondary fuel discharge orifices, said primary fuel discharge orifice and said plurality of secondary fuel discharge orifices are disposed in an annular ring positioned within the air intake and beneath a throttle plate; and
   atomizing and spraying with positive pressure the fuel into the flow of air via the primary fuel discharge orifice and said plurality of secondary fuel discharge orifices.

2. The method of claim 1, further comprising: controlling, via an electronic control unit, a position of said throttle plate to regulate the flow of air in the air intake; and regulating, via the electronic control unit, an amount of fuel provided to the primary fuel discharge orifice and plurality of secondary fuel discharge orifices.

3. The method of claim 1, further comprising:
   mechanically controlling a position of a throttle plate to regulate the flow of air in the air intake.

4. The method of claim 1, wherein the primary fuel discharge orifice is larger than each of the plurality of secondary fuel discharge orifices.

5. The method of claim 4, wherein the primary fuel discharge orifice and the plurality of secondary fuel discharge orifices are positioned and sized such that between 40% and 60% of the fuel enters the air intake through the primary fuel discharge orifice.

6. The method of claim 1, wherein at least one of the plurality of fuel discharge orifices has an orifice shape selected from the group consisting of a circular orifice shape, an ovular orifice shape, an elliptical orifice shape, and a polygonal orifice shape.

* * * * *